US008564766B2

(12) United States Patent
Berghmans

(10) Patent No.: US 8,564,766 B2
(45) Date of Patent: Oct. 22, 2013

(54) SENSOR ELEMENT FOR A SORTING DEVICE AND METHOD FOR SORTING PRODUCTS

(75) Inventor: Paul Berghmans, Scherpenheuvel (BE)

(73) Assignee: Best 2 NV, Heverlee (BE)

( * ) Notice: Subject to any disclaimer, the term of this patent is extended or adjusted under 35 U.S.C. 154(b) by 456 days.

(21) Appl. No.: 12/808,129

(22) PCT Filed: Dec. 15, 2008

(86) PCT No.: PCT/BE2008/000103
§ 371 (c)(1),
(2), (4) Date: Jun. 14, 2010

(87) PCT Pub. No.: WO2009/076730
PCT Pub. Date: Jun. 25, 2009

(65) Prior Publication Data
US 2010/0290040 A1 Nov. 18, 2010

(30) Foreign Application Priority Data
Dec. 14, 2007 (BE) .................................. 2007/0597

(51) Int. Cl.
*G01N 21/00* (2006.01)

(52) U.S. Cl.
USPC ....................................................... 356/237.3

(58) Field of Classification Search
USPC ...................... 356/237.3; 250/559.11, 559.16
See application file for complete search history.

(56) References Cited

U.S. PATENT DOCUMENTS 4,644,151 A 2/1987 Juvinall
4,723,659 A * 2/1988 Billion .......................... 209/576
4,764,670 A 8/1988 Pace et al.
5,419,438 A 5/1995 Squyres et al.

FOREIGN PATENT DOCUMENTS

NL 8104922 A 3/1982
WO 93/07468 A 4/1993
WO 01/07950 A 2/2001
WO 2006/126027 A 11/2006

OTHER PUBLICATIONS

International Search Report of PCT/BE2008/000103 mailed Aug. 6, 2008.

* cited by examiner

*Primary Examiner* — Roy M Punnoose
(74) *Attorney, Agent, or Firm* — Browdy and Neimark, PLLC

(57) ABSTRACT

The invention relates to a sorting device and a method for sorting products (1) that are moved in a flow of products (2) through an inspection zone (3), wherein a light beam (6) is moved over the flow of products such that substantially all products (1) are hit by the light beam (6) in said inspection zone (3), whereby the light of this light beam (6) is, on the one hand, directly reflected as of the point of impact of the light beam on the products, and is, on the other hand, reflected in a scattered manner as of a zone round the point of impact following the diffusion of the light beam's light in the products, whereby the directly reflected light as well as the light which is reflected in a scattered manner is at least partly directed to a sensor element (19) of a detector (15), whereby this sensor element (19) has at least two detection areas, wherein for each detection area a detection signal is generated corresponding to the intensity of the reflected light (14) that impinges upon this detection area.

31 Claims, 2 Drawing Sheets

Figure 2:
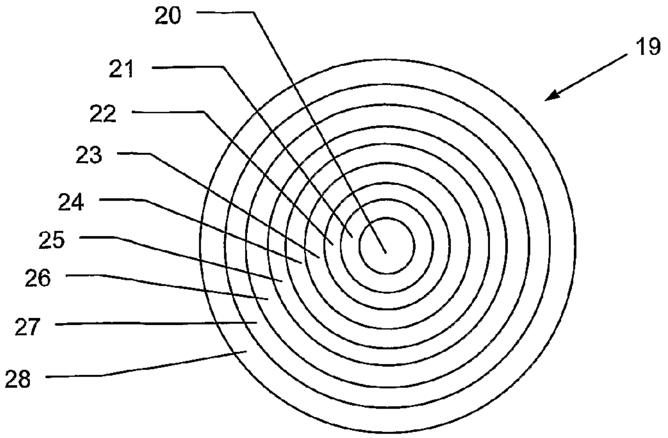

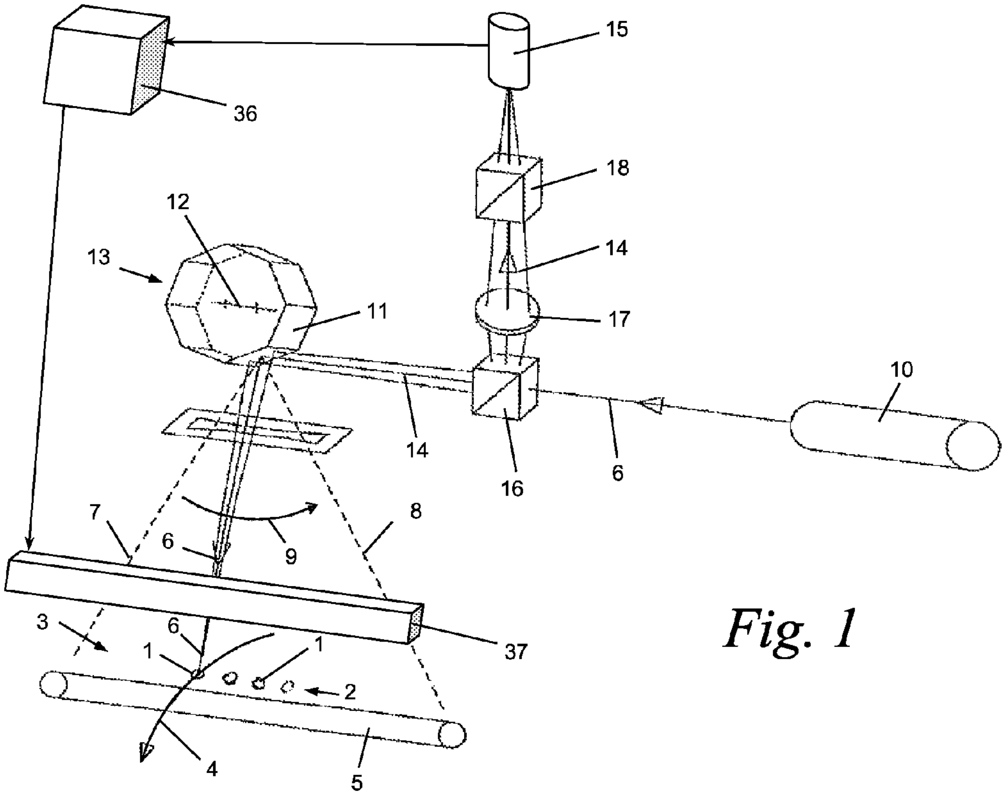
Fig. 1
Fig. 5
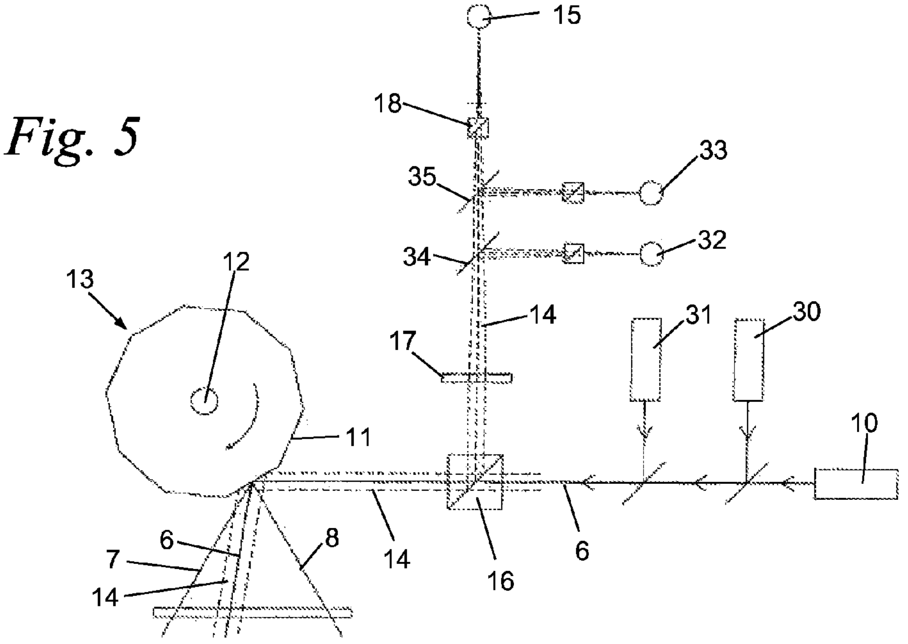

SENSOR ELEMENT FOR A SORTING DEVICE AND METHOD FOR SORTING PRODUCTS

The invention concerns a sorting device with an inspection zone for detecting impurities or undesired products in a flow of products moving through this inspection zone with at least one light source for generating a light beam, whereby means are provided to move said light beam substantially crosswise in relation to the direction of movement of the product flow so that nearly all products are hit by the light beam in said inspection zone, whereby the light of said light beam is directly reflected as of the point of impact of the light beam on the products on the one hand and is reflected in a scattered manner on the other hand as of a zone round the point of impact due to the diffusion of the light beam's light in the products, whereby at least one detector is further provided in which the directly reflected light as well as the light which is reflected in a scattered manner coming from said light source enters at least partly.

With the known sorting devices, the products are sorted on the basis of colour, structure, shape and any possible fluorescence phenomena. When sorting on the basis of colour, the light which is reflected by the product is measured. The intensity of the light reflected by the product at a certain wavelength represents the brightness of said product at that particular wavelength. When this is done simultaneously for several wavelengths or light bands, the combination of the different degrees of brightness per colour band or wavelength will provide the colour information about the product that is being scanned by the light beam.

In order to obtain a correct colour sorting, one must make sure that the reflected light beam entering the different detectors of the sorting device is reflected in one and the same spot and at the same time by the products to be sorted. With the existing laser-controlled sorting devices, the used light has different wavelengths and it originates from different laser sources. These sorting devices comprise an optical system with mirrors, lenses and other optical components to combine the light beams of the different laser sources into a single coaxial light beam containing all the beams of the different lasers. The perfect coaxial combination of the different light beams is very important to obtain a perfect colour detection. For, while scanning the products, the same information must be simultaneously obtained for the different wavelengths for a specific product that is being scanned.

When sorting on structure, the existing sorting devices make use of an incident laser beam on the product to be inspected. If the product reflects the light beam in the same shape as that of the incident laser beam on the product, it will be assumed that the product is a hard product. If the product reflects the light beam in a scattered manner, this implies that it is a soft product. The diffusion of the incident light, and in other words the scattered reflection of said light, will then be mostly due to the low opacity of the product or its transparency.

Thus, it is possible to detect for example the difference between a white bean and a white stone having an identical shape and colour. The stone will reflect the laser beam in a point in the form of directly reflected light, whereas the bean will reflect the light in a scattered manner because of its low opacity. The latter effect is also called "scattering". Hence, the light reflected by the bean will comprise light produced by the scattering effect. This effect is explained in detail in U.S. Pat. No. 4,723,659 by Billion.

The used wavelength of the laser light has an influence on the scattering effect, i.e. on the amount of light that is reflected in a scattered manner. Thus, it is not possible to optimally use said effect with visible laser light since, for example, a green pea will absorb the light of a red laser because of the colour. When measuring the scattering effect, i.e. the amount of scattered, reflected light, of a pea with a red laser, this would produce the same result as when measuring a stone. That is why an infrared laser is used to sort most products, since the reflection by the products is hardly or not influenced by the colour of the product with this laser.

The technique as described in U.S. Pat. No. 4,723,659 makes it possible to sort products on the basis of their structural differences. Thus, for example stones may be detected in a product flow of white beans, sticks and stalks in a product flow of raisins, shells in a product flow of nuts or strange objects in a mix of different coloured vegetables.

Document U.S. Pat. No. 6,864,970 solves certain disadvantages related to sorting products according to document U.S. Pat. No. 4,723,659.

According to U.S. Pat. No. 6,864,970, two types of product reflections are detected. To this end, the reflected light beam is split in two. Each of the two parts enters a matching detector via a separate diaphragm. A first detector receives the directly reflected light corresponding to the centre of the reflected light beam and a second detector observes substantially all the reflected light. For soft products is thus generated a lower detection signal by the first detector than would be the case for hard products, as part of the light is scattered in the product and is thus lost. Hard products produce a substantially equal amount of light on both detectors. Consequently, the difference in the signals of both detectors is a measure for the opacity of the inspected products.

However, this method has a number of major disadvantages. Thus, the diaphragms determining the field of vision of the detectors are fixed elements in the sorting device. If it is required to sort different types of products in a sorting device, this implies that the optical arrangement will have to be manually adjusted by mounting other diaphragms in the optical system. However, it is not advisable to do this in environments where this type of sorting devices are arranged because of any possible moisture, dust and variations in temperature.

A second disadvantage of these known sorting devices is that the reflected laser light must be split in two and that, consequently, the intensity of the light beam entering each of the detectors is halved. This results in more noise in the signals generated by the detector. Should any additional detectors with matching diaphragms be required to sort the products, a part of the reflected light will each time have to be optically deflected, as a result of which the strength of the signal generated at the detectors will each time decrease.

Further, a background element is provided in the inspection zone of the known sorting devices. It is normally made sure for this background element to have the same optical qualities as the products to be sorted, from which impurities or undesired products must be separated. When the light beam thus moves over the product flow in the inspection zone, it will enter between the products on the background element. However, a disadvantage hereby occurs in that, when the light beam moves on the edge of the product from the background element to the product and from the product to the background element, a part of the light that is scattered by the background element will not be observed by the detectors. This scattered, reflected light is indeed partly withdrawn from the sight of the detectors because of the presence of the product between the background element and the detectors at the time the incident light beam moves over the edge of the product. Due to these edge effects, a dark outlining is each time obtained on the edges of the product, which entails the risk for a good product to be detected as an impurity or an undesired product.

In order to be able to sort the products as well as possible, the light beam reflected by the products must enter the detectors substantially in the centre. Thus, with the known sorting devices, the sorting device must be partly dismantled at regular points in time and the direction of the light beam must be checked and possibly adjusted manually. This is a labour-intensive and time-consuming procedure.

The invention aims to remedy the above-mentioned and other disadvantages by providing a sorting device which makes it possible to generate a detection signal which produces considerably less noise and which is thus more reliable than in case of the known sorting devices. Further, the invention will allow for the detection of edge effects, so that substantially no suitable product whatsoever will be detected as an impurity or an undesired product, whereby the sorting device is moreover fit to sort different types of products without having to be manually readjusted to that end. Moreover, the sorting device according to the invention makes it possible to check the direction of the light beam and to automatically rectify it if necessary. Besides, the use of diaphragms for adjusting the field of vision of the sorting device's detector is usually unnecessary according to the invention. The sorting device according to the invention does not only make it possible to detect impurities or undesired products in a product flow, but also to measure the ripeness or hardness of certain products in a non-destructive manner.

To this aim, the detector of the sorting device comprises a sensor element which is divided in at least two detection areas, whereby the detector, generates a detection signal for each detection area corresponding to the intensity of the reflected light entering said detection area. The detector hereby works in conjunction with a control unit which receives said detection signals and generates at least one control signal on the basis of these detection signals.

Advantageously, said detector comprises a central detection area having a size that is smaller than or substantially equal to the cross section of the part of the reflected light beam corresponding to said point of impact and which enters the detector.

According to a preferred embodiment of the sorting device according to the invention, said sensor element comprises concentric, ring-shaped detection areas.

According to an interesting embodiment of the sorting device according to the invention, the sensor element of said detector is divided in different sectors of a circle having preferably the same size, whereby the detector generates a sector signal for at least some detection areas corresponding to the intensity of the light of the part of said light beam which enters the part of the detection areas situated in said sectors of a circle.

According to a special embodiment of the sorting device according to the invention, said control unit works in conjunction with means for adjusting the direction of said light beam as a function of said sector signals coming from identical detection areas from different sectors of the sensor element of the detector.

The invention also concerns a method for sorting products that are moved in a product flow through an inspection zone in order to remove impurities or undesired products from the product flow. A light beam is hereby moved substantially crosswise in relation to the direction of movement of the products over the product flow, as a result of which substantially all products are hit by the light beam in said inspection zone. The light of this light beam is reflected directly as of the point of impact of the light beam on the products on the one hand, and it is reflected in a scattered manner as of a zone round the point of impact following the diffusion of the light beam's light in the products on the other hand. The direct as well as the scattered reflected light is guided at least partly to a sensor element of a detector, whereby this sensor element is provided with at least two detection areas, whereby a detection signal is generated for each detection area corresponding to the intensity of the reflected light which enters the detection area. On the basis of these detection signals, at least one control signal is generated.

According to an interesting embodiment of this method, said control signal is used to control a removal device for removing impurities or undesired products from said product flow.

In an advantageous manner, a deviation from the position of the main point of the reflected light beam in relation to a predetermined position on said sensor element is determined on the basis of said at least one control signal.

With the method according to the invention, a central detection area is selected, for example, whose size is smaller than or substantially equal to the cross section of the part of the reflected light beam which corresponds to said point of impact and which enters the sensor element, whereby said directly reflected light is made to enter said central detection area.

According to a major embodiment of the method according to the invention, concentric, ring-shaped detection areas are selected on said sensor element, whereby said scattered, reflected light is made to enter said ring-shaped detection areas.

Further, said sensor element is preferably divided in detection areas forming a sector of a circle.

Other particularities and advantages of the invention will become clear from the following description of a few specific embodiments of the sorting device and the method according to the invention. This description is merely given as an example and it does not restrict the scope of the claimed protection in any way; the following figures of reference refer to the accompanying drawings.

FIG. 1 schematically represents the major optical elements of a first embodiment of the sorting device according to the invention.

FIG. 2 schematically represents a sensor element with concentric, ring-shaped detection areas according to the invention.

Figure 3:
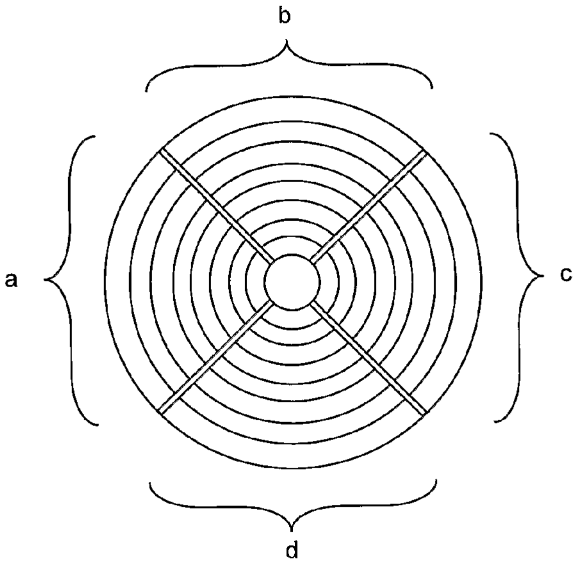

FIG. 3 schematically represents the detection areas of a sensor element which is divided in sectors of a circle of a sorting device according to the invention.

Figure 4:
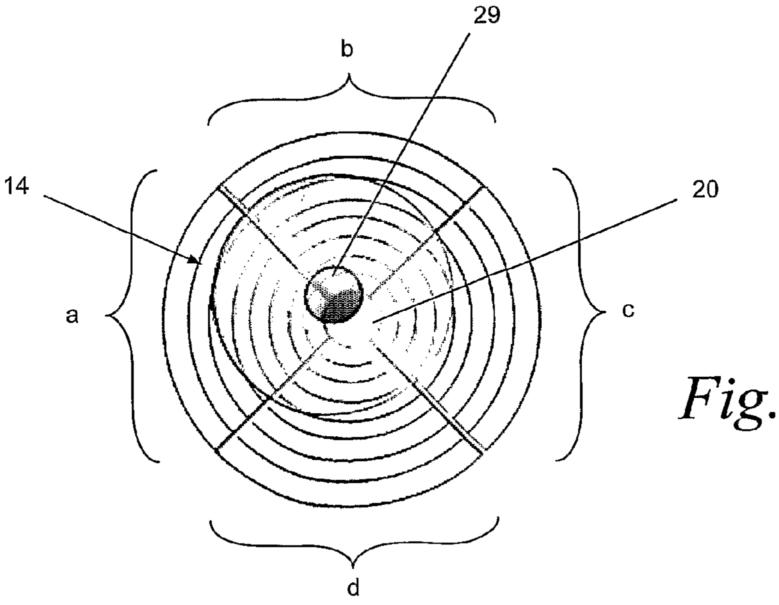

FIG. 4 shows the sensor element from FIG. 3 with an incident light beam reflected by a product.

FIG. 5 schematically represents the major optical elements of a second embodiment of the sorting device according to the invention.

In the different figures, the same figures of reference refer to identical or analogous elements.

The invention generally concerns a sorting device for sorting preferably granular products such as for example peas, nuts, raisins, deep-frozen products, etc. by means of an incident, concentrated light beam on the product flow. By sorting is understood in the present description removing strange elements, impurities, products which do not meet the imposed quality demands, etc. from a product flow. Said light beam is hereby formed for example of one or several concentric laser beams.

FIG. 1 describes a first embodiment of such a sorting device. The products to be sorted 1 are moved via a food device, not represented in the figure, through an inspection zone 3 of the sorting device in a wide flow 2 having the thickness of substantially one product 1. The food device may for example comprise a vibrating table followed by a downward inclined plate as described in EP 0 952 895. The products to be sorted 1 are placed on the vibrating table and leave the latter via the inclined plate. As they leave said inclined plate, the products move in free fall through said inspection zone 3 according to the direction of the arrow 4.

In the inspection zone 3, the sorting device has a background element 5 in the shape of a tube whose colour and other optical qualities are preferably substantially identical to those of the products to be sorted 1. The products 1 of the product flow 2 are scanned in the inspection zone 3 by a concentrated light beam 6 moving between two extreme positions 7 and 8 according to the direction of the arrow 9. The light beam 6 is hereby moved substantially crosswise in relation to the direction of movement 4 of the product flow 2, such that substantially all products 1 are hit by the light beam 6 in said inspection zone 3.

The light beam 6 is generated by a light source 10, for example by a laser source, and it enters the mirror surfaces 11 of a polygon mirror 13 rotating round its central axis 12 as of this light source 10. The mirror surfaces 11 extending according to the perimeter of the polygon mirror 13 reflect the light beam 6 onto the product flow 3 and the background element 5. As a result of the rotational movement of the polygon mirror 13, the light beam 6 moves between said two extreme positions 7 and 8.

If the light beam 6 hits a product 1, the light of this light beam 6 will be directly reflected as of the point of impact of the light beam 6 onto said product 1 on the one hand, and said light will be reflected in a scattered manner as of a zone round the point of impact following the diffusion of the light beam's 6 light in the product 1 on the other hand.

If the light beam 6 hits an impurity or an undesired product 1, then the amount of directly reflected or scattered, reflected light will differ from that of a good product 1. Thus, this directly reflected and scattered, reflected light will be detected, enabling us to distinguish impurities or undesired products from good products.

The directly reflected and scattered, reflected light forms a reflected light beam 14 which is guided to a sensor element of a detector 15. The trajectories of the incident light beam 6 and that of the reflected light beam 14 hereby coincide substantially up to a beam separator 16 provided between the light source 10 and the polygon mirror 13. The beam separator 16 makes sure that the reflected light beam 14 is separated substantially entirely from the incident light beam 6 on the products 1. Such a beam separator 16 can, for example, be formed of a mirror with a central opening as described in document U.S. Pat. No. 4,634,881 or it can separate both light beams 6 and 14 from one another on the basis of the polarisation of said light beams as described in EP 1 332 353.

Via said beam separator 16, the reflected light beam 14 is guided through one or several lenses 17 to a polarising beam separator 18 and it will finally enter the sensor element of the detector 15. The polarising beam separator 18 is optional and it is provided for example if the beam separator 16 is formed of a mirror having a central opening.

FIG. 2 shows a sensor element 19 of the detector 15. This sensor element 19 has several detection areas 20, 21, 22, . . . , 27, 28 whereby the detector 15 generates a detection signal for every detection area corresponding to the intensity of the part of the reflected light beam 14 which enters the detection area concerned. These detection signals are received by a control unit 36 of the sorting device. On the basis of the detection signals, at least one control signal will be generated by the control unit 36.

Said sensor element 19 preferably has a substantially circular-shaped detection area 20 in its centre whose size is smaller than or substantially equal to the cross section of the reflected light beam 14 corresponding to the point of impact of the incident light beam 6 on a product 1 in the product flow 2. Thus, substantially all the directly reflected light of said reflected light beam 14 will enter this central detection area 20 of the detector 15. Consequently, the detection signal which is generated by this central detection area 20 is substantially in proportion to the intensity of the light that is directly reflected by the products 1.

Successive ring-shaped detection areas 21, 22, . . . , 27, 28 connect onto this central detection area 20. These ring-shaped detection areas are substantially concentric to the central detection area 20. By each of the ring-shaped detection areas is generated an individual detection signal which is in proportion to the intensity of the light of the part of the incident reflected light. Thus, the sum of the detection signals generated by these ring-shaped detection areas is in proportion to the intensity of the light which is reflected by the products 1 in a scattered manner and which enters the detector 15.

The detection signals generated by the different detection areas are compared, for example individually or combined, to preset reference values in the control unit corresponding to the detection signals for a good product in order to generate said control signal.

It is also possible to determine the relation between, for example, the detection signals of the ring-shaped detection areas and the central detection area 20 or to mutually compare the detection signals of the ring-shaped detection areas so as to generate one or several control signals. Such control signals correspond then, for example, to the hardness or softness of a product. Thus, it is for example possible to distinguish soft from hard products or to measure the ripeness of certain products in a non-destructive manner. In this way, hard potatoes can be distinguished from soft potatoes.

Further, the sorting device is preferably provided with a removal device 37, represented schematically in FIG. 1, which makes it possible to remove impurities or undesired products from the product flow 2. Such a removal device consists for example of a row of compressed air valves mounted opposite said product flow and over the entire width thereof such that, by opening a compressed air valve, an impurity or an undesired product can be blown out of the product flow. The compressed air valves of the removal device are hereby operated by the control unit as a function of the generated control signal.

In order to obtain an optimal sorting of the products 1 in the product flow 2, the part of the reflected light beam 14 which corresponds to the light which is directly reflected by the products substantially entirely hits the central detection area 20 in the middle.

According to an interesting embodiment of the sorting device according to the invention, this also makes it possible to control the direction of the reflected light beam 14 so as to check whether said light beam 14 hits the sensor element 19 of the detector 15 in the middle.

To this end, the sensor element 19, as shown in FIG. 3, is divided in sectors of a circle a, b, c and d having preferably the same size. The detector 15 makes it possible to generate sector signals for these sectors a, b, c, and d. A sector signal for a specific ring-shaped detection area is in proportion to the intensity of the part of the light of the reflected light beam 14 which enters said ring-shaped detection area in the sector concerned. If the different sectors connect, the total number of the sector signals for a specific ring-shaped detection area will thus correspond to the detection signal for that detection area.

If it is thus found that the different sector signals of one and the same ring-shaped detection area are not equal to one another, or are at least not of the same order of magnitude, we may conclude that the reflected light beam 14 does not hit the sensor element 19 in the middle. In that case, a control signal will be generated by the control unit which indicates that the direction of the reflected light beam 14 is not optimal.

FIG. 4 shows a sensor element 19 with an incident reflected light beam 14 which is such that the directly reflected light 29 of said light beam 14 does not hit the central detection area 20 in the middle. This figure clearly shows that the sector signals which are generated for the different sectors a, b, c and d are different.

According to a preferred embodiment of the sorting device according to the invention, it comprises means to adjust the direction of the reflected light beam 14 in relation to the sensor element 19 as a function of control signals that are generated by the above-mentioned control unit on the basis of the sector signals coming from identical detection areas from different sectors of the sensor element 19.

Such means comprise for example one or several moving mirrors that are controlled by the control unit which make it possible to adjust the direction of at least the reflected light beam 14 so as to make it hit the sensor element 19 in the middle, such that the directly reflected light substantially entirely enters the central detection area 20.

According to a variant embodiment of the sorting device, said means make it possible to adjust the position of the sensor element 19 in relation to the reflected light beam 14.

Apart from that, the use of a sensor element 19 which is divided in different sectors also makes it possible to detect the presence of any edge effects. As soon as one has made sure that the reflected light beam 14 enters the sensor element 19 in the middle and if it is then found that the sector signals coming from identical detection areas from different sectors of the sensor element are different or not of the same order of magnitude, one may decide that there is an edge effect. In that case, a control signal will be generated by the control unit indicating for example that one must not take said detection into account.

In order to generate a control signal that is as clear as possible when an edge effect occurs, the sensor element 19 has for example four sectors of a circle a, b, c and d, whereby the boundary between these sectors is situated at 45°, 135°, 225° and 315° in relation to the direction of movement 9 of the light beams 6 and 14.

The sensor element 19 is preferably formed of a multipixel semiconductor photodiode, in particular a silicon photomultiplicator (SiPM), whereby said detection areas are formed of a group of avalanche photodiodes (APD's) situated next to one another.

Such a sensor element 19 makes it possible to dynamically adjust the size and shape of the detection areas by means of said control unit as a function of the nature of the detection or control signals that one wishes to generate.

FIG. 5 shows a second embodiment of the sorting device according to the invention. This sorting device is different from that in FIG. 1 in that it comprises three laser light sources 10, 30 and 31 and three detectors 15, 32 and 33. The light sources 10, 30 and 31 generate light of different wavelengths and the light beams coming from these light sources are combined into a single coaxial light beam 6.

The reflected light beam 14 is split by filters 34 and 35 in separated light beams of different wavelengths which each hit a corresponding detector 15, 32 or 33.

As is clear from the description above, the sensor element is preferably divided such in detection areas that it has an at least n-fold rotational symmetry in relation to the central detection area 20, whereby n is larger than or equal to three. By an n-fold rotational symmetry should be understood that when the sensor element rotates at an angle of 360° /n round the centre of the central detection area 20, an identical image is formed of the sensor element with the detection areas as for said rotation.

If n=3, then the sensor element will have for example three identical detection areas which each form a sector of a circle covering an angle of 120°, whereas if the sensor element only has ring-shaped detection areas, for example next to said central detection area, then n will be infinitely large.

Thus, such a rotational symmetry implies for example that the sensor element comprises a central detection area surrounded by concentric, ring-shaped detection areas, or that the sensor element only has detection areas forming sectors of a circle, or that the sensor element is formed of a combination of ring-shaped detection areas and detection areas in the form of sectors of a circle. Such a sensor element may possibly also consist of ring-shaped detection areas which are divided in circle sectors.

Further, the central detection area 20 is preferably not a part of the ring-shaped detection areas or of the detection areas having the shape of the sector of a circle. By a sector of a circle is understood in this case the part of the sector of a circle situated outside the central detection area 20.

Naturally, the sorting device and the method according to the invention are not restricted to the above-described embodiments. Thus, the different detection areas or sectors of a circle of the sensor element may not connect, or a detection signal may not be generated for every detection area or for every sector of a circle.

Further, it goes without saying that said ring-shaped detection areas can be subdivided in detection areas extending per sector of a circle. The detection signals thus correspond to the sector signals.

Although the detection areas are circular or ring-shaped in the above description, they may of course have other, either or not regular shapes.

Thus, the sensor element may only have detection areas in the shape of circle sectors when it is merely used to determine the direction of the reflected light beam 14 or to establish the presence of any edge effects, for example.

The invention claimed is:

1. A sorting device comprising:

an inspection zone for detecting impurities or undesired products in a flow of products moving through said inspection zone with at least one light source to generate a light beam, a drive device provided to move said light beam substantially crosswise in relation to the direction of movement of the product flow, such that substantially all products are hit by the light beam in said inspection zone, wherein the light of said light beam is directly reflected as of the point of impact of the light beam on the products, and is reflected in a scattered manner as of a zone around the point of impact following the diffusion of the light beam's light in the products, at least one detector provided in which the directly reflected light and the light that is reflected in a scattered manner coming from said light source enters at least partly, wherein said detector comprises a sensor element which is divided in at least two detection areas, wherein said sensor element is circular and/or has an at least three-fold rotational symmetry, and the detector generates a detection signal for each detection area corresponding to the intensity of the reflected light impinging upon said detection area, and wherein said sorting device further comprises:

a control unit operably connected to said detector to receive said detection signals and generate at least one control signal on the basis of these detection signals and a removal device provided which works in conjunction with said control unit in order to remove impurities or undesired products from said product flow on the basis of said control signal.

2. The sorting device according to claim 1, wherein said detector comprises a central detection area whose size is smaller than or substantially equal to the cross section of the part of the reflected light beam which corresponds to said point of impact and which impinges upon the detector.

3. The sorting device according to claim 1, wherein said sensor element comprises concentric, ring-shaped detection areas.

4. The sorting device according to claim 1, wherein said sensor element has detection areas forming a sector of a circle or which are formed by a part of a ring-shaped detection area which is situated in a sector of a circle.

5. The sorting device according to claim 1, wherein said control unit generates a control signal on the basis of a relation between said detection signals coming from different detection areas.

6. The sorting device according to claim 1, wherein said control unit compares the detection signals with preset reference values in order to generate said control signal.

7. The sorting device according to claim 1, wherein the sensor element of said detector is divided in different sectors of a circle having preferably the same size, wherein the detector generates a sector signal for at least a few detection areas which corresponds to the intensity of the light of the part of said light beam impinging upon one of said sectors of a circle.

8. The sorting device according to claim 7, wherein said control unit works in conjunction with an adjustment device to adjust the direction of said light beam as a function of said sector signals coming from identical detection areas from different sectors of the sensor element (19) of the detector.

9. The sorting device according to claim 1, further comprising a beam separator to separate the incident light beam on the products from the light beam reflected by the products.

10. The sorting device according to claim 1, wherein said sensor element is formed of a multipixel semiconductor photodiode.

11. The sorting device according to claim 1, wherein said sensor element comprises at least one silicon photomultiplicator.

12. The sorting device according to claim 1, wherein said detection areas are formed of a group of avalanche photodiodes.

13. The sorting device according to claim 1, wherein said detection areas substantially connect to one another.

14. The sorting device according to claim 1, wherein said light source comprises a laser source.

15. A method for sorting products which are moved in a product flow through an inspection zone in order to remove impurities or undesired products from the product flow comprising the steps of:

moving a light beam substantially crosswise in relation to a direction of movement of the products over the product flow, such that substantially all products are hit by the light beam in said inspection zone, directly reflecting the light of said light beam as of the point of impact of the light beam on the products, and reflecting, in a scattered manner, the light of said light beam in a zone around the point of impact following diffusion of the light of the light beam in the products, guiding the directly reflected light and the light that is reflected in a scattered manner at least partly to a sensor element of a detector, providing sensor element with at least two detection areas, said sensor element being circular and/or having at least a three-fold rotational symmetry, generating a detection signal for each detection area corresponding to the intensity of the reflected light which impinges upon the detection area, generating at least one control signal on the basis of said detection signals, and using said control signal to control a removal device in order to remove impurities or undesired products from said product flow.

16. The method according to claim 15, further comprising determining a deviation from the position of the main point of the reflected light beam in relation to a predetermined position on said sensor element on the basis of said at least one control signal.

17. The method according to claim 15, further comprising selecting a central detection area whose size is smaller than or substantially equal to the cross section of the part of the reflected light beam which corresponds to said point of impact and which enters the sensor element, and causing said directly reflected light to impinge upon the central detection area.

18. The method according to claim 15, further comprising selecting concentric, ring-shaped detection areas on said sensor element, and causing said scattered reflected light to impinge upon said ring-shaped detection areas.

19. The method according to claim 15, wherein said sensor element is divided in detection areas forming a sector of a circle.

20. The method according to claim 15, wherein said control signal is generated on the basis of a relation between said detection signals coming from different detection areas.

21. The method according to claim 15, further comprising comparing said detection signals with preset reference values to generate said at least one control signal.

22. The method according to claim 15, wherein the sensor element of said detector is divided in different sectors of a circle having preferably the same size, and further comprising generating a sector signal for at least a few detection areas which corresponds to the intensity of the light of the part of said light beam entering one of said sectors of a circle.

23. The method according to claim 22, further comprising adjusting the orientation of said light beam as a function of said sector signals coming from identical detection areas from different sectors of the sensor element of the detector in order to make the part of the reflected light beam which corresponds to said point of impact impinge centrally onto the sensor element.

24. The method according to claim 15, further comprising separating the incident light beam on the products from the light beam that is reflected by the products, whereby this reflected light beam is directed to said sensor element.

25. The method according to claim 15, wherein a multipixel semiconductor photodiode is used for said sensor element.

26. The method according to claim 15, wherein said sensor element is formed at least partly of a silicon photomultiplicator.

27. The method according to claim 15, wherein said detection areas are formed of a group of avalanche photodiodes.

28. The method according to claim 15, wherein said detection areas are selected such that they substantially connect to one another.

29. The method according to claim 15, wherein said light beam is formed of at least one laser.

30. The method according to claim 15, further comprising generating a control signal which indicates that an edge effect has been observed when sector signals coming from identical detection areas from different sectors of the sensor element are different or are not of the same order of magnitude.

31. A method for sorting products which are moved in a product flow in order to remove impurities or undesired products from the product flow, comprising the steps of:

moving a light beam substantially crosswise in relation to the direction of movement of the products over the product flow so that substantially all products are hit by the light beam, whereby the light of this light beam is reflected by the products and is guided at least partly to said sensor element, using a multipixel semiconductor photodiode, comprising a silicon photomultiplicator, for a sensor element in a sorting device, wherein this sensor element is divided in detection areas formed of a group of avalanche photodiodes situated next to one another.

* * * * *